United States Patent

Lawrence et al.

[15] 3,697,892

[45] Oct. 10, 1972

[54] DIGITAL FREQUENCY-SHIFT MODULATOR USING A READ-ONLY-MEMORY

[72] Inventors: Thomas R. Lawrence, Leonardo; Burton R. Saltzberg, Middletown, both of N.J.

[73] Assignee: Bell Telephone Laboratories, Incorporated, Murray Hill, Berkeley Heights, N.J.

[22] Filed: Feb. 19, 1971

[21] Appl. No.: 116,998

[52] U.S. Cl. .................332/9 R, 178/66 R, 325/163, 328/63, 332/11 R

[51] Int. Cl. ..........................................H04l 27/12

[58] Field of Search .....332/9, 9 T, 11, 11 D; 328/63; 325/30, 163; 178/66

[56] References Cited

UNITED STATES PATENTS

| | | | |
|---|---|---|---|
| 3,292,034 | 12/1966 | Braaten | 328/63 X |
| 3,393,364 | 7/1968 | Fine | 332/11 D X |
| 3,095,539 | 6/1963 | Bennett et al. | 325/163 |
| 3,386,035 | 5/1968 | Wood | 328/63 X |
| 3,553;368 | 1/1971 | Rudolph | 325/163 X |
| 3,611,209 | 10/1971 | Saltzberg | 332/9 R |

*Primary Examiner*—Alfred L. Brody
*Attorney*—R. J. Guenther and Kenneth B. Hamlin

[57] ABSTRACT

FSK signals in a digital sense are obtained from a memory comprising a table of forty numbers, representing amplitudes of points in one cycle of a sine wave, the points being separated by equal phase angles. A processor reads out, at a fixed rate, the numbers corresponding to each tenth or each eleventh point in accordance with the condition of an incoming binary signal, whereby the output numbers represent a frequency-shift wave. Digital circuitry is used and the modulator may be time shared by a plurality of data sources.

8 Claims, 7 Drawing Figures

INVENTORS T. R. LAWRENCE
B. R. SALTZBERG
BY R C Lipton
ATTORNEY

| | | | | | | | | | | |
|---|---|---|---|---|---|---|---|---|---|---|
| 0 | 0 | 0 | 1 | 3 | 6 | 9 | 12 | 16 | 21 | 25 |
| 1 | 30 | 35 | 39 | 44 | 48 | 51 | 54 | 57 | 59 | 60 |
| 2 | 60 | 60 | 59 | 57 | 54 | 51 | 48 | 44 | 39 | 35 |
| 3 | 30 | 25 | 21 | 16 | 12 | 9 | 6 | 3 | 1 | 0 |
| | 0 | 1 | 2 | 3 | 4 | 5 | 6 | 7 | 8 | 9 |

DIGITAL FREQUENCY-SHIFT MODULATOR USING A READ-ONLY-MEMORY

FIELD OF THE INVENTION

This invention relates to frequency-shift signal transmitters and, more particularly, to signal transmitters, such as frequency-shift signal modulators, which utilize digital techniques and are therefore capable of being shared, on a time-division basis, by a plurality of signaling sources.

DESCRIPTION OF THE PRIOR ART

In the data processing and data switching arts the central processor or switcher terminates large numbers of outgoing data signaling channels. The data channel, in many instances, will comprise a telephone line which conventionally is suitable to convey voice frequency signals. Accordingly, voice frequency-shift signals, representing the dc data baseband signals from the processor or switches signaling source, are generated and applied to the appropriate signaling channels. Switching the frequency of the voice frequency signal carrier under control of the dc data signals is provided by a data set transmitter modulator, which generally utilizes (inductive and/or capacitive) oscillatory circuits to produce the voice frequency signals.

Since a plurality of outgoing channels are terminated, the data set transmitters (together with receivers and control equipment) are sometimes grouped to form an arrangement called a multiple data set. To reduce the size, cost and complexity of the multiple data set, it is advantageous to employ equipment which can be used in common by the data set transmitters.

The most significant circuit in the transmitter is the oscillatory circuit. It is known that an oscillatory circuit which utilizes digital circuitry to generate frequency-shift signals (in a numerical sense) is capable of being shared on a time-shared basis by a plurality of data sources. One form of a digital oscillatory circuit is a digital filter which is placed on the borderline of stability and therefore oscillates (in a numerical sense). Digital frequency-shift modulators of this type are disclosed in the applications of B. R. Saltzberg, Ser. No. 884,128, filed on Dec. 11, 1969, now U.S. Pat. No. 3,611,209 and Ser. No. 28,872, filed on Apr. 15, 1970.

The digital filter is relative complex in circuitry, performing relatively complex digital computations. In addition, the output signals of the digital circuitry are subject to severe amplitude variations (in a numerical sense), due principally to quantizing noise. Finally, when the output frequency is shifted, these digital modulators produce amplitude changes and phase discontinuities, sometimes called "jitter." In the B. R. Saltzberg application, Ser. No. 884,128, there is disclosed correction circuitry for eliminating the amplitude variations. In B. R. Saltzberg application, Ser. No. 28,872, an arrangement is described for eliminating the jitter. These correction circuits, however, are also relatively complex.

It is, therefore, an object of this invention to provide a frequency-shift modulator using digital techniques, the improvement involving an arrangement which performs relatively simple computations, which inherently is not subject to amplitude variations, and which does not produce amplitude changes and phase discontinuities when the frequency is shifted.

SUMMARY OF THE INVENTION

The present invention is embodied in a modulator which, in general, comprises a memory (or look-up table) that defines the signal amplitudes of predetermined spaced points on a sine wave and a processor that selects and reads out the defined amplitudes under control of an incoming baseband signal. Advantageously, the signal amplitudes are digitally defined so that both the memory and the processor circuitry are digital and the modulator is capable of being time shared by a plurality of sources. Moreover, since the signal amplitude values are predefined in the memory, the modulator is inherently free of amplitude variations due to quantizing noise.

In accordance with the specific embodiment of this invention disclosed hereinafter, the memory comprises a table of amplitude digital values of 40 successive points on the sine wave separated by equal phase angles. The processor selects and reads out each 10th or 11th one of the successive point amplitude values in accordance with the binary condition of the baseband signal whereby the output digital values, when converted to analog signals, produce a frequency-shift wave. The processing of the successive points to calculate each phase angle together with the storage, in the memory, of the predefined amplitude values of each phase angle of the sine wave results in the elimination of amplitude and phase discontinuities when the frequency of the wave is shifted.

It is a feature of this invention that the successive points are identified by consecutive numbers. The look-up table is accordingly arranged to read out an amplitude value when a corresponding identifying number is applied thereto. Calculation of the identifying number is provided by sampling the baseband signal and adding 10 or 11 to the identifying number to produce the identifying number that is to be next subsequently applied to the look-up table. Therefore, only simple computations need be performed.

The foregoing and other objects and features of this invention will be more fully understood from the following description of an illustrative embodiment thereof taken in conjunction with the accompanying drawings.

DETAILED DESCRIPTION

The digital modulator is advantageously embodied in a system which may be described as a multiple data set transmitter which interconnects a plurality of sources of baseband binary data signals and a corresponding plurality of outgoing telephone lines. Specifically, the dc baseband data signals from each of the data sources are frequency modulated on a voice frequency carrier and the frequency shift signals provided therefrom are applied to an associated telephone line. In general, these functions are provided by a scanner, identified in FIG. 1 by block 102; digital FSK modulator 103; distributor 104; and clock counter 201 in FIG. 2, which maintains the system synchronized.

Figure 1:
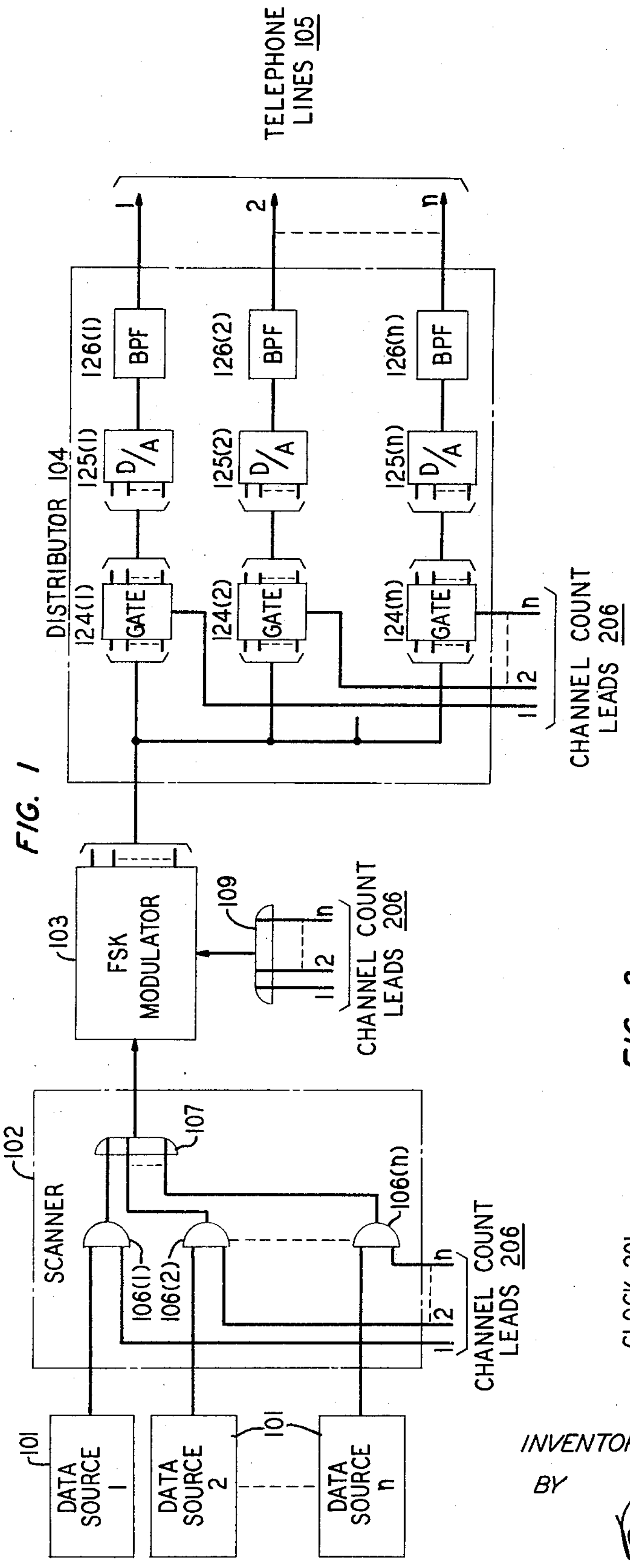
FIG. 1 discloses, in schematic form, the various equipment, including a digital frequency-shift modulator, and the manner in which they cooperate to form a multiple data set transmitter in accordance with this invention.

The plurality of baseband binary data signal sources are identified as a group in FIG. 1 as data sources 101. In FIG. 1 there are shown *n* data sources represented by blocks and identified by numbers 1 through *n*, and each block so identified represents a source of dc baseband binary data signals.

Scanner 102 generally provides the function of scanning the dc baseband signals provided by data sources 101 under the control of scanning or gating signals provided by clock 201 by way of channel count leads 206. Scanner 102 produces at the output thereof successive trains of bits, each train comprising a sequence of bits corresponding to sequential scanning of the data signals provided by sources 1 through *n* of data sources 101. These serial bit trains at the output of scanner 102 are then passed to FSK modulator 103.

The function of FSK modulator 103 is to utilize digital techniques for examining successive bit samples (derived from an individual data source) and for calculating successive numbers (dedicated to the data source), which numbers define amplitudes of successive points on a frequency-shift wave. Each incoming bit from scanner 102 is examined by FSK modulator 103, which shifts (in a numerical sense) the frequency of its output signal wave to above the carrier midband frequency when the incoming bit is a logical "1" (mark signal) and to below the midband carrier frequency when the incoming bit is a logical "0" (space frequency). Synchronization of FSK modulator 103 with the rest of the system is provided by clock pulses derived from channel count leads 206 and ORed through OR gate 109.

The output of FSK modulator 103 comprises successive binary numbers, each binary number comprising a plurality of binary bits appearing at the output in a time slot defined by channel count leads 206 and corresponding to the time slot of the data source which provided the incoming bit which processed the number. The binary bits of each binary number are then passed, in parallel, to distributor 104.

Distributor 104 accepts the parallel bits of each output number from FSK modulator 103 and, under control of channel count leads 206 from clock 201, provides three functions, namely:

1. distributes to individual channels therein the successive numbers developed by FSK modulator 103;

2. converts each digital number to a corresponding analog signal; and 3. filters the analog signals to eliminate undesired frequency components and applies the filtered signals to a corresponding one of telephone lines 105. As seen in FIG. 1, distributor 104 includes a plurality of outputs extending to telephone lines 105. There are shown *n* telephone lines, each symbolically representing the tip and ring of a telephone line and identified by a number from 1 to *n*, which number also shows the association with the correspondingly numbered one of data sources 101.

Figure 2:
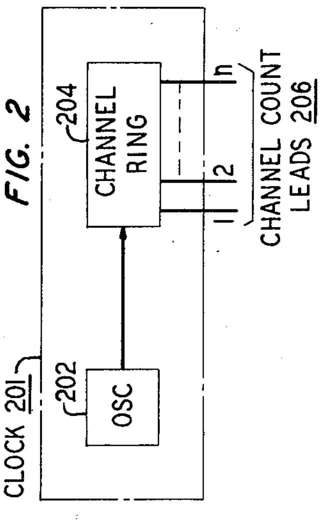
FIG. 2 shows, in schematic form, a suitable arrangement for a common clock circuit.

Clock counter 201 in FIG. 2, as previously described, produces a channel count for the sequential sampling of the channel and distribution of the signals. The clock generally includes a clock source, such as an oscillator identified by block 202 in FIG. 2, and channel ring 204. The output of oscillator 202 is applied to and drives channel ring 204. Channel ring 204 advantageously comprises a multistage bit counter, the number of counts provided by the counter corresponding to the number of data sources and the corresponding number of telephone lines or channels. As channel ring 204 attains each count, it provides an output to one of *n* leads shown as channel count leads 206. Accordingly, the *n* leads of channel count leads 206 are sequentially pulsed or enabled, each sequential pulse defining the time slot dedicated to the correspondingly identified data source.

As indicated above, sequential pulses on channel count leads 206 are utilized for scanning the dc baseband binary signals derived from data sources 101. The sequential pulses and, therefore, the rate at which channel ring 204 is driven, define the sampling or scanning frequency. In the specific embodiment shown, every line is scanned at the rate of 8,100 Hz, the master clock of the data set runs at a frequency of $(8,100 \times n)$ Hz, and the two frequencies transmitted are 2,227.5 Hz and 2,025 Hz for marking and spacing.

As seen in FIG. 1, each data source is connected to an individual gate in scanner 102. Specifically, data source 1 is connected to one input of gate 106(1) and each of the other data sources extends to a corresponding one of gates 106(2) through **106(*n*). The other inputs to gates 106(1) through 106(*n*) are connected to individual ones of channel count leads 206**. These leads, as previously described, are sequentially pulses or enabled. The dc baseband signals from data sources 1 through *n* are therefore sequentially sampled and passed through gates 106(1) to **106(*n*) and then to OR gate 107. The output of OR gate 107 therefore comprises sequential bit trains, each bit train comprising a sequence of bits, each bit in the train aligned in a time slot dedicated to a data source and defining the dc baseband signal of that particular source. These signal bit trains are then passed to FSK modulator 103**.

Figure 5:
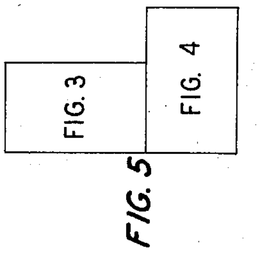

The operation of FSK modulator 103 will now be described for an individual data source. The details of the modulator, shown in FIGS. 3 and 4 and arranged in accordance with FIG. 5, are directed to one individual channel. The modulator accommodates a plurality of channels on a time-shared basis by providing a simple modification which will be discussed hereinafter.

With respect to the discussion of the single channel operation, it will be assumed that the scanned bits of only one source, such as data source 101(1), are applied to the modulator input and that the clock pulses from only one lead of channel count leads 206, such as count lead 1, are applied to the clock pulse input of the modulator. It is therefore recalled that the clock pulse frequency rate for the channel is 8,100 Hz.

The output of the modulator is arranged to define a six-bit positive binary number. This positive number, as discussed above, defines a level of a signal wave. This signal wave assumes the form of a sine wave wherein the positive numbers representing the several levels are calculated by the equation $$k+k\sin\theta,$$

where $\theta$ is the phase angle and $k$ is a constant representing one-half the amplitude excursion of the wave. In the present arrangement, $k$ equals 30 and the minimum and maximum amplitudes of the sine wave are defined by the numbers 0 and 60.

In this specific embodiment, the modulator has the capability of storing 40 samples of a single cycle of a sine wave. Each of the numbers stored is calculated from the above equation, with the resultant number rounded to the nearest integer. To aid in understanding what sample information is stored in the modulator, attention is directed to FIG. 6.

Figures 6, 7:
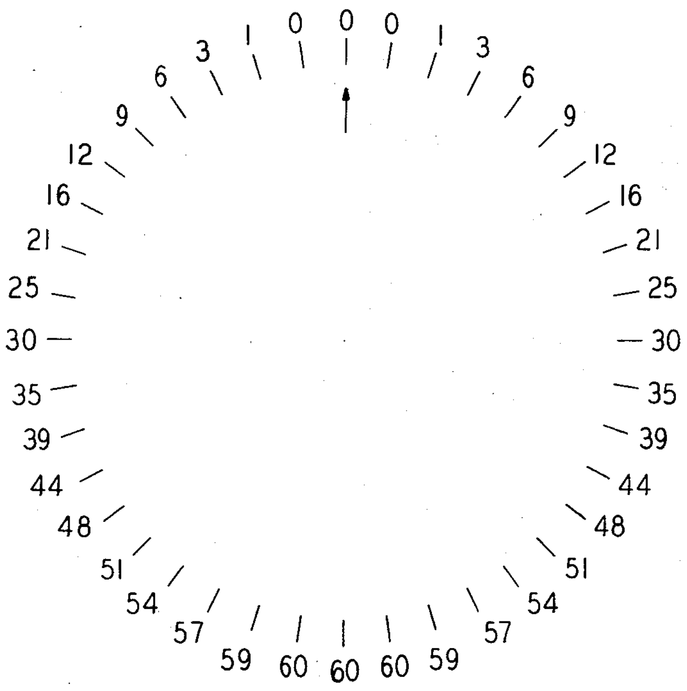
FIG. 6 depicts a representation of various phase angles in a cycle of a sine wave.
FIG. 7 discloses a table representing the values defined in the look-up table in the frequency-shift modulator.

Examining FIG. 6, the numbers are drawn in a circle adjacent to 40 evenly spaced marks, the interval between each pair of adjacent marks corresponding to a phase angle of 360/40, or 9°. Traveling clockwise around the circle, at each mark is written the number corresponding to the level of the sine wave at that phase angle. Thus, the sine wave level is traced out by continuously traveling clockwise around the circle.

It is recalled that the individual clock channel frequency is 8,100 Hz and that the space signal is 2025. Since the clock frequency is four times the spacing frequency, the modulator will put out four binary numbers for each cycle of the spacing frequency. The sequence is four numbers or samples at the output of the modulator is repetitive for each cycle so long as the data input remains spacing.

The ratio between the marking frequency and the spacing frequency is 2227.5:2025. This can be reduced to 11:10 and means that the time it takes to complete 10 cycles of the spacing frequency is the same as the time it takes to complete 11 cycles of the marking frequency.

In a sequence of ten cycles of spacing frequency we will have 40 samples since there are four samples per cycle. With the ratio of the two frequencies being 11:10, it can also be said that in 40 samples there is completed 11 cycles of marking frequency. Referring to FIG. 6, if for every clock pulse we travel clockwise 10 marks, we would obtain four samples for each cycle of the spacing frequency. The corresponding numbers would thus trace out a sine wave of the frequency 2,025 Hz.

To increase the output frequency to 2,227.5 Hz, we simply travel clockwise 11 marks for each clock pulse. After 40 successive samples, traveling clockwise 11 marks for each sample, we will have completed 11 cycles of the frequency 2,227.5 Hz.

The first row, that is, row 0, in FIG. 7 represents the numbers which are obtained from the circle in FIG. 6 if we start at the arrow in the circle and travel clockwise through 10 marks or the phase angle of 90°. Each succeeding row similarly defines the numbers in the successive quadrant. To continue to trace the sine wave, row 3, of course, would then be succeeded again by row 0.

To produce a frequency of 2,025 Hz, start at any arbitrary point in the table and count 10 spaces to the right for the next sample. By doing this the next sample is always in the same column but in the next subsequent row. Accordingly, every column of the table contains all the samples necessary to produce a complete cycle of 2,025 Hz.

To produce 2,227.5 Hz, start at any point and count eleven spaces to the right for the next sample. In this event, the next sample is in the next column to the right (as shown in FIG. 7) and in the next subsequent row, with the exception that when we start in column 9 the next sample is always in column 9 and in two rows subsequent.

Figure 3:
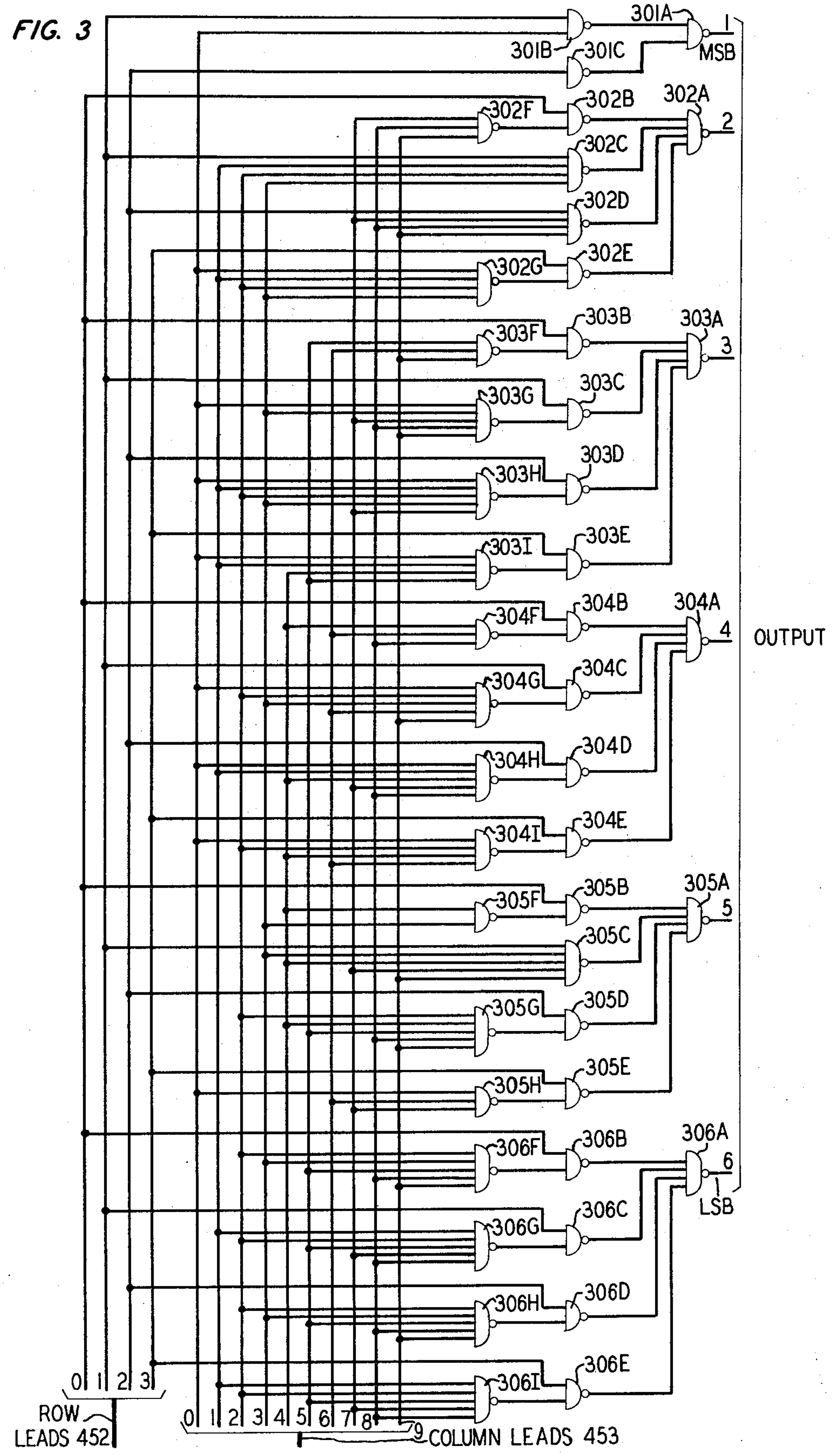
FIG. 3 and FIG. 4, when arranged as shown in FIG. 5, show the details of the circuitry which forms a digital frequency-shift modulator in accordance with this invention.
Figure 4:
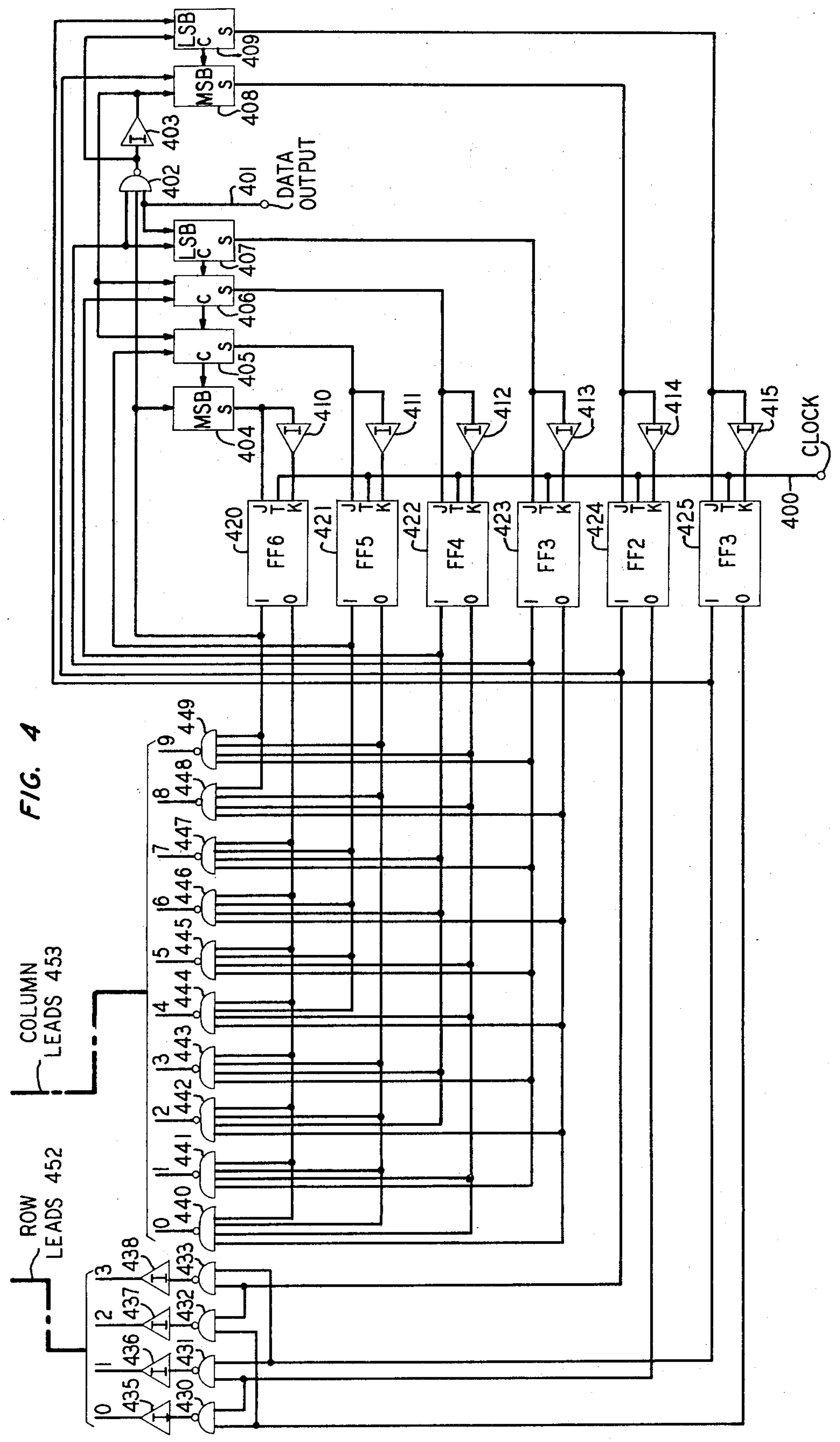

FSK modulator 103 is arranged to calculate the identity or number of each row and column and generate the specific multibit number as defined by intersection of the row and column. The circuit for calculating each row and column is shown in FIG. 4. FIG. 3 discloses the READ ONLY memory for generating the multibit binary number corresponding to the calculated row and column.

The data input from the data source obtained from the output of scanner 102 appears on terminal 401 in FIG. 4. This data is applied to an adder generally indicated by block 407. As described hereinafter, the complete adder circuit comprises adders 404 through 407, with adder 407 calculating the least significant bit and adder 404 calculating the most significant bit.

The input data on terminal 401 is also applied to gate 402. One output of gate 402 is passed to inverter 403 and the outputs of gate 402 and inverter 403 are passed to an adder circuit shown as blocks 408 and 409. It is noted that the output of inverter 403 is also passed to adders 405 and 406.

Considering now adders 408 and 409, the most significant bit is calculated by adder 408 and the least significant bit is calculated by adder 409. Inspecting adders 408 and 409 in greater detail, it is seen that two inputs are applied to adder 409, which, in turn, generates a "sum" output designated by the letter *s* and a "carry" output, shown by the letter *c*. The "sum" output of adder 409 is then applied to flip-flop 425, with the "carry" output being applied to an input of adder 408. The "sum" output of adder 408 is passed to flip-flop 424.

Flip-flops 424 and 425 store the row address or number. This number is, in turn, applied to the inputs of adders 408 and 409. The output of flip-flop 424 comprises the most significant bit of the row address and is thus passed to one input of adder 408. Similarly, the output of flip-flop 425, which comprises the least significant bit of the row number, is passed to an input of adder 409. Flip-flops 424 and 425 therefore produce at their outputs a two-bit binary number defining one of the four rows in the table of FIG. 7. Adders 408 and 409, in turn, calculate the number of the next row, as determined by the number output of flip-flops 424 and 425 and the data input signal, as described in detail hereinafter.

Assume now that a spacing or logical "0" data signal is passed to data input terminal 401. The output of gate 402 is, therefore, a logical "1" and inverter 403 has a "0" at its output. With gate 402 applying a "1" bit to adder 409 and inverter 403 applying a "0" bit to adder 408, the binary number produced by flip-flops 424 and 425 is increased by "1." This new number is applied directly to the J inputs of flip-flops 424 and 425 and to the K inputs of the flip-flops by way of inverters 414 and 415.

The incoming clock pulse appears on input terminal 400. This clock pulse is passed to the toggle, or T, inputs of flip-flops 424 and 425, enabling the newly calculated number to be stored in the flip-flops. It is to be recalled that the clock pulse is derived from the output of OR gate 109 in FIG. 1. Insofar as we are discussing one data source, the clock pulse is considered to be the pulse derived from the channel count lead corresponding to the data source.

The outputs of flip-flops 424 and 425 are also passed to gates 430 through 433. When the flip-flops store a binary "00," "0" bits are derived from the output of both flip-flops, a logical "0" is developed at the output of gate 430 and logical "1's" are developed at the outputs of gates 431 through 433. In a similar manner a binary "01" on the outputs of flip-flops 424 and 425 develops a logical "0" at the output of gate 431 and logical "1's" at the outputs of the other gates. In the same manner, logical "0's" are developed at the outputs of gates 432 and 433 in response to the development of binary numbers "10" and "11" by flip-flops 424 and 425. Inverters 435 through 438 invert the logical outputs of gates 430 through 433 and these outputs are then applied through common row lead cable 452 to the READ ONLY memory shown in FIG. 3.

The column address or number is stored by flip-flops 420 through 423, flip-flop 420 storing the most significant bit and flip-flop 423 storing the least significant bit of the binary number. Outputs of flip-flops 420 to 423 are function to inputs of adders 404 through 407 and these adders function to calculate the next subsequent column number.

Returning now to data input terminal 410, it is recalled that the data signal thereon is passed to an input of adder 407. Terminal 401 is also connected to gate 402 and the output of gate 402 is applied to inverter 403, whose output, in turn, is applied to adders 405 and 406. Under our assumed condition, the input data is a logical "0." The output of gate 402 is therefore a logical "1" and the output of inverter 403 is a logical "0." Data input terminal 401 is therefore applying a logical "0" to adder 407, and inverter 403 is applying logical "0's" to adders 405 and 406. The new number calculated by adders 404 to 407 is therefore the same number as the one applied to the adder circuit by flip-flops 420 to 423. This new number is directly applied from the "sum" outputs of adders 404 through 407 to the J inputs of flip-flops 420 through 423 and is applied to the K inputs of the flip-flops by way of inverters 410 through 413. The clock pulse on terminal 400 then inserts the number calculated by adders 404 through 407 in flip-flops 420 through 423. Thus, with a "0" bit data input, there is no change in the number stored by flip-flops 420 through 423 and the flip-flops are maintained in the same condition.

The outputs of flip-flops 420 through 423 are also passed to gates 440 through 449. Gates 440 to 449 individually correspond to column numbers 0 to 9 as shown in the table in FIG. 7. The inputs to each of the gates are connected to the outputs of flip-flops 420 to 423 in such a manner as to develop at the output of the gate a logical "0" if the column number stored by the flip-flops corresponds to the particular gate and a logical "1" if the column number does not correspond. Specifically, if the column number stored by the flip-flops is "0," the inputs to gate 440 are all high and the gate output is a logical "0." Gates 441 through 449, however, have at least one input that is low and all of these gates are applying logical "1's" to their outputs. In a similar manner, each of the other gates develops a logical "0" at its output when and only when the number corresponding thereto is being stored by flip-flops 420 through 423. The outputs of gates 440 through 449 are then passed through common column leads 453 to the READ ONLY memory shown in FIG. 3.

Assume now that the data input on terminal 401 is a logical "1." Assume further that the column number stored by flip-flops 420 through 423 constitutes a number less than nine. In this event either flip-flop 420, which stores the most significant bit, or flip-flop 423, which stores the least significant bit, is producing a logical "0" at its output. This logical "0" is applied to gate 402, whereby the gate produces a logical "1" and inverter 403 produces a logical "0." Accordingly, the outputs of adders 408 and 409 are producing a number greater by one than the row number applied to the adder by flip-flops 424 and 425 in the same manner as previously described. The next clock pulse applied to terminal 400, therefore, stores this new row number and this number, in turn, is then passed to row leads 452, as previously described.

At this time, data input terminal 401 is applying a logical "1" to adder 407, and inverter 403 is applying logical "0's" to adders 405 and 406. Adders 404 through 407 are therefore generating a number greater by one than the column number applied thereto by flip-flops 420 through 423. The next clock pulse on terminal 400 therefore inserts this new column number in flip-flops 420 through 423 and the new number is thus passed to column leads 453, as previously described.

In the event that the column address is a binary "9," flip-flops 420 and 423 are both storing logical "1" bits on the "1" outputs thereof. These "1" bits are applied to gate 402. Since data input terminal 401 is also applying a logical "1" to gate 402, the output of the gate becomes a logical "0." Inverter 403 thereupon generates a logical "1" at its output. A binary number two (1, 0) is therefore applied by inverter 403 and gate 402 to adders 408 and 409. Accordingly, when the column address is a binary number nine and the data input is a logical "1," the newly calculated row address is increased by two.

The output of inverter 403 is also passed to adders 405 and 406. When the column address is binary number nine and the data input is a logical "1," "1" bits are applied to adders 405 through 407 by terminal 401 and inverter 403. This corresponds to applying a binary number seven (1, 1, 1) to the adder circuit. Adders 404 to 407 therefore add seven to the binary number stored by flip-flops 420 to 423, which in this case is the binary number nine. The resultant sum at the outputs of the adders is the binary number 0 (0, 0, 0, 0), since the adders do not provide a carry for the most significant bit. Therefore, when the column address is a binary nine and the data input is a logical "1," the next row number is increased (or is greater) by two than the previous row number and the next column number is a binary zero.

The logic circuit shown in FIG. 4 can be readily modified to accept bit trains from a scanner of a plurality of data sources, such as scanner 102, and to compute row and column numbers for the bit train on a time-shared basis with timing provided by channel count clock pulses derived from OR gate 109. This modification consists of substituting a multistage shift register for each of flip-flops 420 to 425. The number of stages in each shift register equals the number of time slots in a clock cycle and therefore equals the number of data sources. Each new number calculated by the adders is stored in the first stages of the shift registers in the same manner as numbers are stored in flip-flops 420 to 425. The clock pulses then shift the number through the register stages and the number appears one clock cycle later at the output of the last register, in the same time slot in which the next data bit from the corresponding data source appears on terminal 401. This output number is applied to the adders and the output gates in FIG. 4 in the same manner as previously described for the single data source.

The memory shown in FIG. 3 comprises a wired memory which reads the binary numbers on row leads 452 and column leads 453 and, in response thereto, generates a six-bit binary number output defining the amplitude of the output wave. The binary number output will comprise the number shown at the intersection of the column and row in the table of FIG. 7.

The six-bit binary number output of the memory is produced by gates 301A through 306A. Gate 301A develops the most significant bit of the binary number and each succeeding gate generates the next most significant bit. Gate 306A generates the least significant bit. Inputting to each of gates 301A through 306A is provided by correspondingly numbered gates which are identified by different letters. For example, the inputs to gate 302A are gates 302B through 302E. The inputs to gates 302B through 302E comprise various leads from row leads 452 and column leads 453 and also include the outputs of gates 302F and 302G, which latter gates are controlled by various ones of column leads 453.

The operation of the several gates is readily understood by considering the operations thereof when specific binary numbers are applied to row leads 452 and column leads 453. It will be assumed for the following operation description, that the logic circuit shown in FIG. 4 signals the memory circuit that the binary output number to be developed should correspond to the number at the intersection of column 2 and row 2 in the table in FIG. 7. In this event, a logical "1" bit is applied to lead 2 of row leads 452 and a logical "0" bit is applied to lead 2 of column leads 453.

The application of the "1" bit to lead 2 of row leads 452 enables gates 301C and 302D through 306D. Since lead 2 of row leads 452 is the sole input for gate 301C, the output of this gate is down. As a result, the output of gate 301A is up. The logical "1" output of gate 301A is applied to the first output lead of the memory and, therefore, the most significant bit of the binary number is a logical "1."

As previously noted, gate 302D is enabled by lead 2 of row leads 452. The other input to gate 302D extends to leads 7, 8 and 9 of column leads 453. Accordingly, if one of these latter leads defines the selected column, the output of gate 302D is up. Alternatively, if one of columns 9 through 6 is the selected column, the output of gate 302D is down. Since we have assumed that the second column has been selected, gate 302D is down and as a consequence the output of gate 302A is up, applying a logical "1" to its output. Accordingly, the next most significant bit is a logical "1."

It was previously noted that gate 303D is enabled by lead 2 of row leads 452. The output of gate 303D is therefore down if the output of gate 303H is up. The inputs to gate 303H are connected to leads 0, 1, 2, 3 and 7 of column leads 453. Since lead 2 has the "0" bit applied thereto, the output of gate 303H is up and as a consequence the output of gate 303D is down. With one input to gate 303A down, the gate applies a logical "1" bit to its output. The third bit of the output binary number is therefore a logical "1."

As previously noted, gate 304D is also enabled by the row lead. The output of the gate is therefore down if gate 304H is up. The inputs to gate 304H are connected to leads, 0, 1, 4, 7 and 8 of column leads 453. Since the logical "0" is applied only to lead 2 of the column leads, the output of gate 304H is down. Gate 304D is therefore, up, applying a logical "1" to gate 304A. The other inputs to gate 304A comprise gates 304B, 304C and 304E. Each of these latter gates has an input to a row lead which does not include lead 2. Accordingly, all of gates 304B through 304E are up and applying logical "1" bits to gate 304A. Gate 304A, in turn, is thus applying a logical "0" bit to its output and the corresponding bit of the output binary number is therefore "0."

Turning now to gate 305D, it was previously noted that this gate is also enabled by lead 2 of the row leads. The output of this gate is therefore down if gate 305G is up. The inputs to gate 305G extend to leads 2, 4, 5, 8 and 9 in column leads 453. SInce the second lead has a logical "0" applied thereto, gate 305G is therefore up and gate 305D is down. With the output of gate 305D providing a logical "0," gate 305A is up, passing a logical "1" bit to its output. The next to the least significant bit in the binary number output is therefore a logical "1."

It was previously noted that gate 306D is enabled. This gate is down if the output of gate 306H is up. The inputs to gate 306H are connected to leads 2, 3, 5, 8 and 9 of column leads 453. The logical "0" bit applied to lead 2 in the column leads drives the output of gate 306H up, driving the output of gate 306D down. As a consequence, gate 306A goes up and applies a logical "1" bit to its output. The least significant bit of the binary output number is therefore a logical "1."

In accordance with the above description, the designation of the column 2 and row 2 by the logic circuit in FIG. 4 results in the generation of the binary number 111011. Inspecting the table, it is seen that the amplitude number at the intersection of row 2 and column 2 is 59. This digital number, of course, corresponds to the binary number output and therefore satisfies the requirements previously defined.

The output numbers of FSK modulator 103 are passed in parallel to distributor 104. More specifically, the several bits of the time-multiplexed numbers are applied in parallel to gates 124(1) through 124($n$). The other inputs to these gates are connected to channel count leads 206. Gates 124(1) through 124($n$) are therefore sequentially enabled. Each gate is arranged, when enabled, to pass therethrough, during the scanning interval allocated to the associated channel, the parallel bits defining the multibit number dedicated to the channel. The parallel bits are thus passed to the associated one of digital-to-analog converters 125(1) through 125($n$).

Each of digital-to-analog converters 125(1) through 125($n$) comprises conventional digital circuits that convert the incoming parallel bits of the binary number to a corresponding analog signal; that is, the analog signal developed by the digital-to-analog converter has an amplitude corresponding to the incoming number. This analog signal is then passed through a bandpass filter, such as bandpass filter 126(1). This removes all of the dc and also removes the discontinuities (or aliases) normally generated by a digital circuit. The output FSK signal of each bandpass filter is then applied to a correspondingly numbered telephone line.

Although a specific embodiment of this invention has been shown and described, it will be understood that various modifications may be made without departing from the spirit of this invention.

We claim:

1. A modulator for generating frequency-shift signals representing binary data signals comprising:

a look-up table means for defining a series of signal values representing the amplitudes of a series of points on a theoretical sine wave, the series of values being identified by consecutive identifying numbers, the look-up table means further being arranged to generate representations of any one of the signal values in response to the application of the identifying number corresponding thereto, and, control means responsive to an incoming binary data signal for producing identifying numbers and applying them to the look-up table means, the control means including processing means for increasing the magnitude of each of the produced identifying numbers in accordance with the binary condition of the data signal to thereby produce the next subsequent identifying number that is applied to the look-up table means.

2. A modulator in accordance with claim 1 wherein all successive ones of the points on the sine wave are separated by equal phase angles and the control means is arranged to apply the identifying numbers to the look-up table means at a fixed rate.

3. A modulator in accordance with claim 2 wherein all of the values represent the amplitudes of points within one cycle of a sine wave and the processing means is arranged to reset and recycle when the magnitude of the number being increased exceeds the magnitude of the largest number identifying a value in the look-up table means.

4. A modulator in accordance with claim 2 wherein the processing means includes adder means for increasing the magnitude of the identifying number by one or the other of a fixed number of units in accordance with the binary condition of the data signal.

5. A modulator comprising:

means for defining the amplitudes of successive points on a theoretical sine wave, the points being separated by equal phase angles, means for selecting $n^{th}$ ones of the successive points at a fixed rate, $n$ representing a variable, the means for selecting including means responsive to a baseband signal for determining the value of $n$, and means for reading out the amplitudes defined by the selected points.

6. A modulator in accordance with claim 5, wherein all of the selected points are within one cycle of the sine wave.

7. A modulator in accordance with claim 6, wherein the amplitudes of the points are digitally defined.

8. A modulator in accordance with claim 7, wherein the successive points are identified by successive numbers and the selecting means is arranged to produce each of the successive numbers by increasing the magnitude of the next prior number by the value of $n$.

* * * * *